(12) United States Patent
Mouknatjou (10) Patent No.: US 8,223,066 B2
(45) Date of Patent: Jul. 17, 2012

(54) PULSED RADAR LEVEL GAUGE SYSTEM AND METHOD WITH REDUCED START-UP TIME

(75) Inventor: Vahid Mouknatjou, Hovås (SE)

(73) Assignee: Rosemount Tank Radar AB, Gothenburg (SE)

( * ) Notice: Subject to any disclaimer, the term of this patent is extended or adjusted under 35 U.S.C. 154(b) by 257 days.

(21) Appl. No.: 12/781,144

(22) Filed: May 17, 2010

(65) Prior Publication Data

US 2011/0279306 A1   Nov. 17, 2011

(51) Int. Cl.
*G01S 13/08* (2006.01)
(52) U.S. Cl. .................................. 342/124; 73/290 R
(58) Field of Classification Search ................. 342/124
See application file for complete search history.

(56) References Cited

U.S. PATENT DOCUMENTS

| 5,883,591 | A |   | 3/1999 | McEwan | 342/22 |
| 5,892,381 | A |   | 4/1999 | Koifman et al. | 327/198 |
| 5,898,308 | A | * | 4/1999 | Champion | 324/643 |
| 2003/0025626 | A1 |   | 2/2003 | McEwan | 342/21 |
| 2008/0105048 | A1 | * | 5/2008 | Nilsson et al. | 73/290 V |
| 2010/0214157 | A1 | * | 8/2010 | McEwan | 342/173 |

FOREIGN PATENT DOCUMENTS

| WO | WO 94/27168 | 11/1994 |
| WO | WO 96/19715 | 6/1996 |

OTHER PUBLICATIONS

International Search Report for PCT/EP2011/057832 filed May 16, 2011, mailed Jul. 22, 2011, 5 pages.
Written Opinion of the International Searching Authority for PCT/EP2011/057832 filed May 16, 2011, mailed Jul. 22, 2011, 4 pages.

* cited by examiner

*Primary Examiner* — Timothy A Brainard
(74) *Attorney, Agent, or Firm* — Westman, Champlin & Kelly, P.A.

(57) ABSTRACT

A radar level gauge system for determination of a filling level of a product contained in a tank including first pulse generating circuitry for generating a transmission signal in the form of a first pulse train having a first pulse repetition frequency and second pulse generating circuitry for generating a reference signal in the form of a second pulse train having a second pulse repetition frequency. The second pulse repetition frequency differs from the first pulse repetition frequency by a predetermined frequency difference. A propagation device propagates the transmission signal towards a surface of the product inside the tank. Measurement circuitry forms a measurement signal based on a reflected signal and the reference signal. Processing circuitry determines a value indicative of a filling level based on the measurement signal.

11 Claims, 5 Drawing Sheets

PULSED RADAR LEVEL GAUGE SYSTEM AND METHOD WITH REDUCED START-UP TIME

TECHNICAL FIELD OF THE INVENTION

The present invention relates to a method of determining a filling level of a product contained in a tank using a pulsed radar level gauge system, and to a pulsed radar level gauge system.

TECHNICAL BACKGROUND

Radar level gauge (RLG) systems are in wide use for determining the filling level of a product contained in a tank. Radar level gauging is generally performed either by means of non-contact measurement, whereby electromagnetic signals are radiated towards the product contained in the tank, or by means of contact measurement, often referred to as guided wave radar (GWR), whereby electromagnetic signals are guided towards and into the product by a probe acting as a waveguide. The probe is generally arranged to extend vertically from the top towards the bottom of the tank. The probe may also be arranged in a measurement tube, a so-called chamber, that is connected to the outer wall of the tank and is in fluid connection with the inside of the tank.

The transmitted electromagnetic signals are reflected at the surface of the product, and the reflected signals are received by a receiver or transceiver comprised in the radar level gauge system. Based on the transmitted and reflected signals, the distance to the surface of the product can be determined.

More particularly, the distance to the surface of the product is generally determined based on the time between transmission of an electromagnetic signal and reception of the reflection thereof in the interface between the atmosphere in the tank and the product contained therein. In order to determine the actual filling level of the product, the distance from a reference position to the surface is determined based on the above-mentioned time (the so-called time-of-flight) and the propagation velocity of the electromagnetic signals.

Most radar level gauge systems on the market today are either so-called pulsed radar level gauge systems that determine the distance to the surface of the product contained in the tank based on the difference in time between transmission of a pulse and reception of its reflection at the surface of the product, or systems that determine the distance to the surface based on the phase difference between a transmitted frequency-modulated signal and its reflection at the surface. The latter type of systems are generally referred to as being of the FMCW (Frequency Modulated Continuous Wave) type.

For pulsed radar level gauge systems, time expansion techniques are generally used to resolve the time-of-flight.

Such pulsed radar level gauge systems typically have a first oscillator for generating a transmission signal formed by pulses for transmission towards the surface of the product contained in the tank with a transmitted pulse repetition frequency $f_t$, and a second oscillator for generating a reference signal formed by reference pulses with a reference pulse repetition frequency $f_r$ that differs from the transmitted pulse repetition frequency by a given frequency difference $\Delta f$. This frequency difference $\Delta f$ is typically in the range of Hz or tens of Hz.

At the beginning of a measurement sweep, the transmission signal and the reference signal are synchronized to have the same phase. Due to the frequency difference $\Delta f$, the phase difference between the transmission signal and the reference signal will gradually increase during the measurement sweep.

During the measurement sweep, the reflection signal formed by the reflection of the transmission signal at the surface of the product contained in the tank is being correlated with the reference signal, to form a measurement signal based on a time correlation between the reflection signal and the reference signal. Based on the measurement signal, the filling level can be determined.

Due to varying DC-offset levels and temperature drift etc. of electronic components comprised in the radar level gauge system some conditioning of the measurement signal is generally required for the radar level gauge system to be able to provide for an accurate filling level determination.

In some existing systems, the signal resulting from the above-mentioned time correlation is high pass filtered to make the measurement signal independent of varying DC-offset levels, temperature drift etc.

Since the relevant bandwidth of the measurement signal includes frequencies close to DC, a high pass filter with a very low frequency cut-off is used.

Such a high pass filter has a very slow step response, which means that the time from powering the radar level gauge system until measurements can start is rather long, in the range of seconds.

Accordingly, currently available pulsed radar level gauge systems typically need to be powered for a substantial period of time before the actual filling level measurement can start, which limits the capability of energy efficient intermittent operation of such radar level gauge systems.

SUMMARY OF THE INVENTION

In view of the above-mentioned and other drawbacks of the prior art, a general object of the present invention is to provide an improved radar level gauge system and method, and in particular a pulsed radar level gauge system and method enabling a more energy efficient filling level determination.

According to a first aspect of the present invention, these and other objects are achieved through a radar level gauge system, for determination of a filling level of a product contained in a tank, the radar level gauge system comprising: first pulse generating circuitry for generating a transmission signal in the form of a first pulse train having a first pulse repetition frequency; second pulse generating circuitry for generating a reference signal in the form of a second pulse train having a second pulse repetition frequency, the second pulse repetition frequency differing from the first pulse repetition frequency by a predetermined frequency difference; a propagation device connected to the first pulse generating circuitry and arranged to propagate the transmission signal towards a surface of the product inside the tank, and to return a reflected signal resulting from reflection of the transmission signal at the surface of the product contained in the tank; measurement circuitry connected to the propagation device and connectable to the second pulse generating circuitry, the measurement circuitry being configured to form a measurement signal based on the reflected signal and the reference signal; and processing circuitry connected to the measurement circuitry for determining a value indicative of a filling level based on the measurement signal, wherein the measurement circuitry comprises: a time-correlator for generating a sequence of values, each value representing a time correlation between a pulse of the reference signal and the reflected signal; a first feedback circuit arranged to receive a signal indicative of said sequence of values, said first feedback circuit comprising a feedback loop including a first integrator having a first time constant; a second feedback circuit arranged to receive the signal indicative of the sequence of values, the second feedback circuit comprising a feedback loop including a second integrator having a second time constant being higher than the first time constant; and activation circuitry allowing selective activation of the first feedback circuit and the second feedback circuit.

The tank may be any container or vessel capable of containing a product, and may be metallic, or partly or completely non-metallic, open, semi-open, or closed. Furthermore, the filling level of the product contained in the tank may be determined directly by using a signal propagation device propagating the transmission signal towards the product inside the tank, or indirectly by using a propagation device disposed inside a so-called chamber located on the outside of the tank, but being in fluid connection with the inside of the tank in such a way that the level in the chamber corresponds to the level inside the tank. The transmission signal is an electromagnetic signal.

Either or both of the first pulse generating circuitry and the second pulse generating circuitry may be provided in the form of a voltage controlled oscillator circuit, which may comprise a crystal oscillator. Alternatively, either or both of the first pulse generating circuitry and the second pulse generating circuitry may comprise a resonator element formed by electronic circuitry comprising a portion with inductive characteristics and a portion with capacitive characteristics.

It should be noted that any one or several of the means comprised in the processing circuitry may be provided as either of a separate physical component, separate hardware blocks within a single component, or software executed by one or several microprocessors.

The time-correlator may, for example, comprise a mixer and the above-mentioned sequence of values may be formed by mixing the reference signal and the reflected signal such that a pulse indicating time correlation is generated each time a reference pulse passes the time domain for the reflected signal. As will be evident to those skilled in the relevant art, the time-correlator can be provided in the form of any circuitry capable of time correlating two signals. Various types of such circuitry are well-known from, for example, time-expansion oscilloscopes.

The activation circuitry allowing selective activation of the first feedback circuit and the second feedback circuit may, for example, be provided in the form of one or several electronic switches, which may, for example, be realized using one or several transistors.

The first time constant of the first integrator may advantageously be less than 10 milliseconds, and the second time constant of the second integrator may advantageously be greater than 50 milliseconds.

The present invention is based on the realization that fast startup and high-quality filling level determination in a pulsed radar level gauge system can be achieved by passing the signal resulting from time-correlation of the reflected signal and the reference signal through first circuitry directly following activation of the measurement circuitry and then switching to second circuitry having other properties than the first circuitry. The present inventor has further realized that the first circuitry should be adapted to achieve the fast startup, that is, keep the transient time down, and that the second circuitry, which can be activated after the transient, should be configured to compensate for/remove the DC-offset, but allow low frequency signals to pass.

Moreover, the present inventor has realized that this desired behavior can be achieved by providing the measurement circuitry of the radar level gauge system with a first feedback circuit comprising a feedback loop including a first integrator having a first time constant; a second feedback circuit comprising a feedback loop including a second integrator having a second time constant being higher than the first time constant; and activation circuitry allowing selective activation of the first feedback circuit and the second feedback circuit.

Using the first feedback circuit, the initial offset can quickly be compensated for, and a short transient time on startup can be provided for, due to the relatively small time constant of the of the first integrator in the feedback loop. Since the first feedback circuit, however, may not only remove the DC offset but also low frequency signal components, the second feedback circuit may advantageously be activated before the reflected signal is expected to arrive at the measurement circuitry.

Accordingly, various embodiments of the present invention provides for a combination of fast startup and a measurement signal that is independent of variations in DC offset etc. This in turn provides for a pulsed radar level gauge system with a reduced power consumption, which is particularly useful for radar level gauge systems that are not connected to fixed power lines, but are powered locally through one or several batteries or other local power source(s), such as wireless radar level gauge systems, for which a low energy consumption is important.

The first feedback circuit and the second feedback circuit may share a common differential amplifier. In this case, the first feedback circuit may comprise the differential amplifier and a feedback loop with the first integrator, and the second feedback circuitry may comprise the differential amplifier and a feedback loop with the second integrator. The activation circuitry may then be configured to allow switching between the first integrator and the second integrator in the feedback loop.

In this case, the first integrator may comprise a first capacitor and a first resistor; and the second integrator may comprise the first capacitor and a second resistor different from the first resistor.

In other words, the first integrator and the second integrator may share the same capacitor. Hereby, the DC offset compensation that is provided when the first feedback circuit is activated is automatically provided also when the second feedback circuit is activated, through the charge stored in the common capacitor. Accordingly, no additional offset compensation is required, which means that the measurement circuitry can operate with a single supply voltage, which provides for a simple and cost-efficient circuit design.

Alternatively, the first feedback circuit may comprise a first differential amplifier and the second feedback circuit may comprise a second differential amplifier different from the first differential amplifier.

Furthermore, each of the first feedback circuit and the second feedback circuit, when activated, may be DC-coupled to the time-correlator.

By "DC-coupled" should be, in the context of the present application, be understood an electrical connection which allows transmission of DC. For example, the first feedback circuit and the second feedback circuit may, when activated, be conductively connected to the time-correlator or to another device that provides a signal indicative of the sequence of values output by the time-correlator.

For example, the pulses output from the time-correlator may be provided to a sample-and-hold circuit to form a continuous signal, and the sample-and-hold circuit may be DC-coupled to the activated one of the first and second feedback circuits.

In such embodiments, the measurement circuitry may further comprise a sample-and-hold circuit having an input connected to the time-correlator and an output connectable to an input of each of the first feedback circuit and the second feedback circuit.

According to one embodiment, the propagation device may be a probe arranged to extend towards and into the product contained in the tank for guiding the transmission signal towards the surface of the product, and guiding the reflected signal back along the probe.

According to another embodiment, the propagation device may comprise an antenna device for radiating the transmission signal towards the surface of the product contained in the tank and capturing the reflected signal resulting from reflection of the transmission signal at the surface of the product contained in the tank.

Furthermore, the radar level gauge system may advantageously be configured to be powered by a local power source, such as a battery and/or solar cells etc.

Moreover, the radar level gauge system may further comprise a radio transceiver for wireless communication with an external device.

According to a second aspect of the present invention, the above-mentioned and other objects are achieved through a method of determining a filling level of a product contained in a tank using a radar level gauge system, the method comprising the steps of: activating the radar level gauge system; generating a transmission signal, the transmission signal being in the form of a first pulse train having a first pulse repetition frequency; generating a reference signal in the form of a second pulse train having a second pulse repetition frequency, the second pulse repetition frequency differing from the first pulse repetition frequency by a predetermined frequency difference; propagating the transmission signal towards a surface of the product contained in the tank; receiving a reflected signal resulting from reflection of the transmission signal at the surface of the product; forming a measurement signal based on the reflected signal and the reference signal; and determining a value indicative of the filling level based on the measurement signal, wherein the step of forming the measurement signal comprises the steps of: time-correlating the reference signal and the reflected signal to generate a sequence of values, each value representing a time correlation between a pulse of the reference signal and the reflected signal; during a first time period following activation, passing a signal indicative of the sequence of values through a first feedback circuit comprising a feedback loop including a first integrator having a first time constant; and after the second time period following activation, passing the signal indicative of the sequence of values through a second feedback circuit comprising a feedback loop including a second integrator having a second time constant being higher than the first time constant.

It should be noted that the method according to the present invention by no means is limited to performing the steps thereof in any particular order, unless so stated. Furthermore, some steps may be performed at one point in time, and other steps at another point in time.

The step of forming the measurement signal may advantageously further comprise the step of controlling an offset voltage of the measurement signal to allow indication of pulses that are negative in relation to the offset voltage as well as pulses that are positive in relation to the offset voltage.

Moreover, the step of forming the measurement signal may further comprise the step of sampling and holding the sequence of values to provide the signal indicative of the sequence of values.

Further embodiments of, and effects obtained through this second aspect of the present invention are largely analogous to those described above for the first aspect of the invention.

BRIEF DESCRIPTION OF THE DRAWINGS

These and other aspects of the present invention will now be described in more detail, with reference to the appended drawings showing a currently preferred embodiment of the invention, wherein.

DETAILED DESCRIPTION OF A PREFERRED EMBODIMENT OF THE INVENTION

In the present detailed description, various embodiments of the radar level gauge system according to the present invention are mainly discussed with reference to a pulsed guided wave radar (GWR) level gauge system utilizing a rigid single line (or Goubau) probe. It should be noted that this by no means limits the scope of the present invention, which is equally applicable to a non contact radar level gauge system having a propagation device in the form of an antenna known in the art, as well as GWR-systems being equipped with various other kinds of probes, such as two-lead probes, flexible probes, etc.

Figure 1:
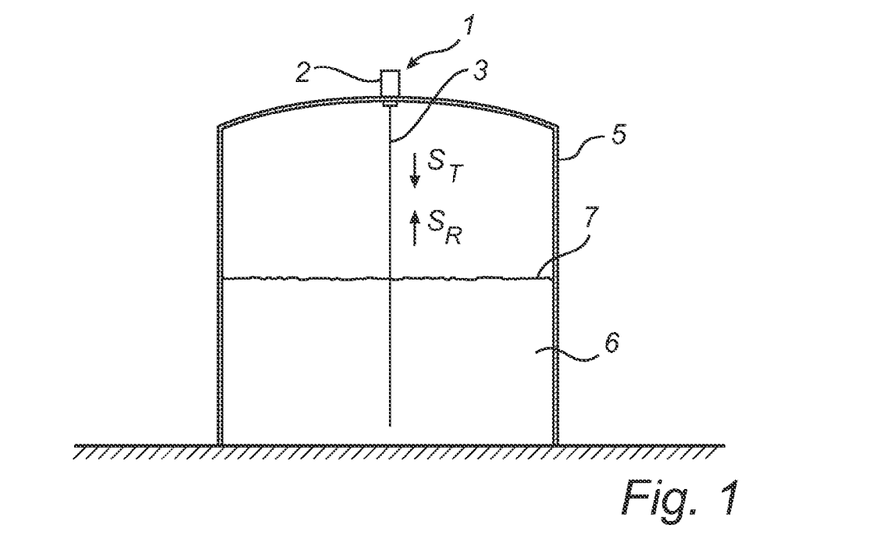
FIG. 1 schematically illustrates a radar level gauge system installed in an exemplary tank.

FIG. 1 schematically illustrates a radar level gauge system 1 comprising a measurement electronics unit 2, and a probe 3. The radar level gauge system 1 is provided on a tank 5, which is partly filled with a product 6 to be gauged. By analyzing transmitted signals $S_T$ being guided by the probe 3 towards the surface 7 of the product 6, and reflected signals $S_R$ traveling back from the surface 7, the measurement electronics unit 2 can determine the distance between a reference position (such as the tank ceiling) and the surface 7 of the product 6, whereby the filling level can be deduced. It should be noted that, although a tank 5 containing a single product 6 is discussed herein, the distance to any material interface along the probe can be measured in a similar manner.

Figure 2:
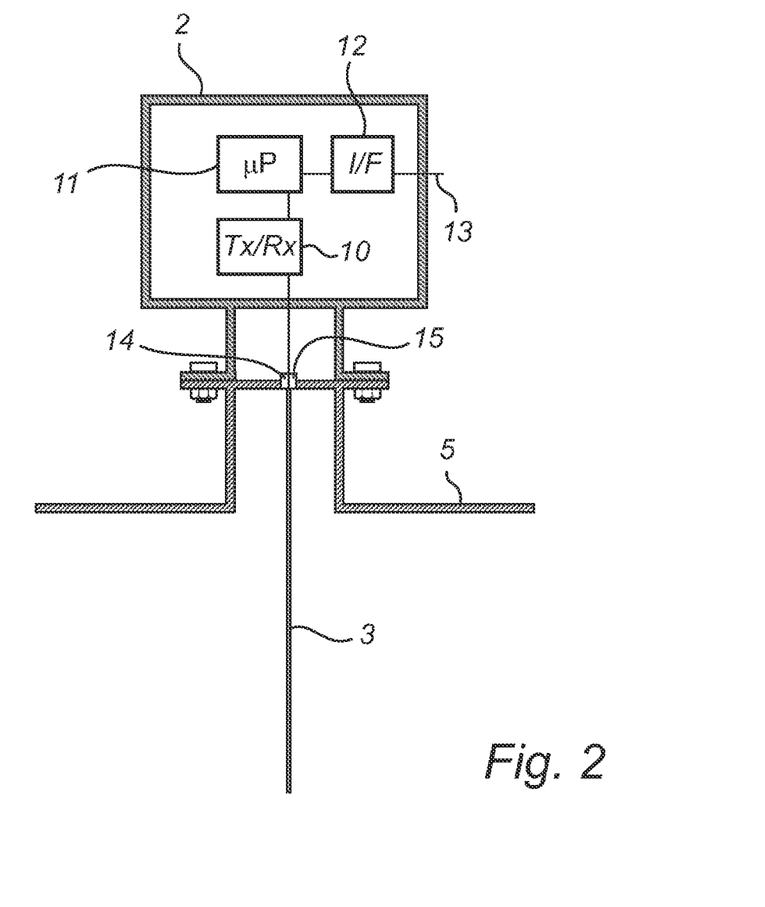
FIG. 2 is a schematic illustration of the measurement electronics unit comprised in the radar level gauge system in FIG. 1.

As is schematically illustrated in FIG. 2, the electronics unit 2 comprises a transceiver 10 for transmitting and receiving electromagnetic signals, a processing unit 11, which is connected to the transceiver 10 for control of the transceiver and processing of signals received by the transceiver to determine the filling level of the product 6 in the tank 5.

The processing unit 11 is, furthermore, connectable to external communication lines 13 for analog and/or digital communication via an interface 12. Moreover, although not shown in FIG. 2, the radar level gauge system 1 is typically connectable to an external power source, or may be powered through the external communication lines 13. Alternatively, the radar level gauge system 1 may be powered locally, and may be configured to communicate wirelessly.

Although being shown as separate blocks in FIG. 2, several of the transceiver 10, the processing circuitry 11 and the interface 12 may be provided on the same circuit board.

In FIG. 2, furthermore, the transceiver 10 is illustrated as being separated from the interior of the tank 5 and connected to the probe 3 via a conductor 14 passing through a feed-through 15 provided in the tank wall. It should be understood that this is not necessarily the case, and that at least the transceiver 10 may be provided in the interior of the tank 5.

Figure 3:
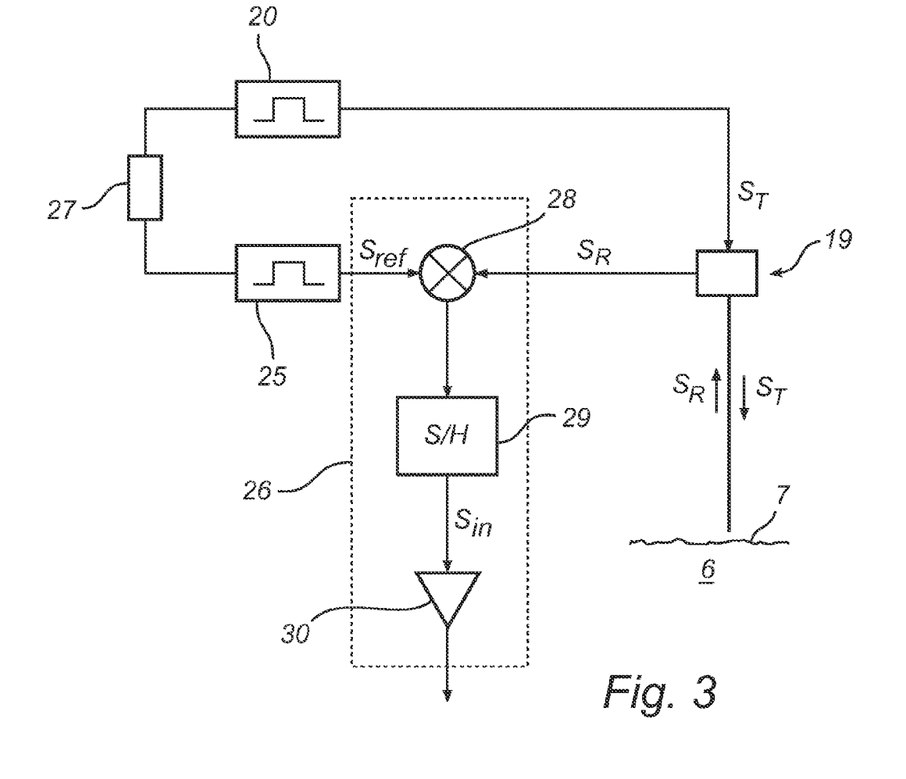
FIG. 3 is a block diagram schematically illustrating the radar level gauge system in FIG. 1.

FIG. 3 is a block diagram schematically showing functional components comprised in the radar level gauge system in FIG. 1. The exemplary radar level gauge system 1 comprises a transmitter branch for generating and transmitting a transmission signal $S_T$ towards the surface 7 of the product 6 contained in the tank (not shown in FIG. 3), and a receiver branch for receiving and operating on the reflected signal $S_R$ resulting from reflection of the transmission signal $S_T$ at the surface 7 of the product 6. As is indicated in FIG. 3, the transmitter branch and the receiver branch are both connected to a directional coupler 19 to direct signals from the transmitter branch to the probe 3 and to direct reflected signals being returned by the probe 3 to the receiver branch.

The transmitter branch comprises first pulse generating circuitry in the form of first pulse generator 20, and the transmitter branch comprises second pulse generator 25 and measurement circuitry 26. The radar level gauge system 1 further comprises a timing control unit 27 for controlling the timing relationship between the transmitted signal output by the first pulse generator and the frequency shifted reference signal $S_{REF}$ output by the second pulse generator 25.

As is schematically indicated in FIG. 3, the measurement circuitry 26 comprises a time-correlator in the form of a mixer 28, a sample-and-hold circuit 29 and amplifier circuitry 30.

It should be noted that the radar level gauge system 1 illustrated in FIG. 3 has been simplified and that radar level gauge systems according to various embodiments of the present invention may comprise additional components, such as high frequency pulse generators on the transmitter branch and the receiver branch whereby pulses each formed by an amplitude modulated pulse train can be used for determining the filling level.

Additionally, as was briefly described above with reference to FIG. 2, the radar level gauge system 1 comprises processing circuitry (not shown in FIG. 3) that is connected to the measurement circuitry 26 for determining the filling level of the product 6 contained in the tank.

When the radar level gauge system 1 in FIG. 3 is in operation to perform a filling level determination, a time correlation is performed in the mixer 28 between the reflected signal $S_R$ and the reference signal $S_{REF}$ that is output by the second pulse generator 25. The reference signal $S_{REF}$ is a signal that differs in frequency from the signal output by the first pulse generator 20, by a predetermined frequency difference $\Delta f$. When a measurement sweep starts, the reference signal $S_{REF}$ and the transmission signal $S_T$ are in phase, and then the time until the reference signal "catches up with" the reflected signal $S_R$ is determined. From this time and the frequency difference $\Delta f$, the distance to the surface 7 can be determined.

The time-expansion technique that was briefly described in the previous paragraph is well known to the person skilled in the art, and is widely used in pulsed radar level gauge systems.

As is clear from the above discussion, the output from the mixer 28 will be a sequence of values, where each value represents a time correlation between a pulse of the reference signal and the reflected signal. This sequence of values are tied together to form a continuous signal using the sample-and-hold circuit 29.

In this context it should be noted that the sample-and-hold amplifier 29 is simply an illustrative example of a device capable of maintaining a voltage level over a given time, and that there are various other devices that can provide the desired functionality, as is well known to the person skilled in the art.

Although the signal present at the output from the sample-and-hold circuit 29 contains all the information required to determine the distance to the surface 7 of the product 6, some conditioning of this signal is generally desirable before it is practically useful for a filling level determination. In particular, the DC offset level of this signal will typically vary with various factors, such as the electrical properties of the material 6 contained in the tank, and the type of probe 3 that is used. Furthermore, the sample-and-hold circuit 29 may, for example, exhibit a temperature drift. Moreover, the signal output from the sample-and-hold circuit 29 may be relatively weak.

Figure 4:
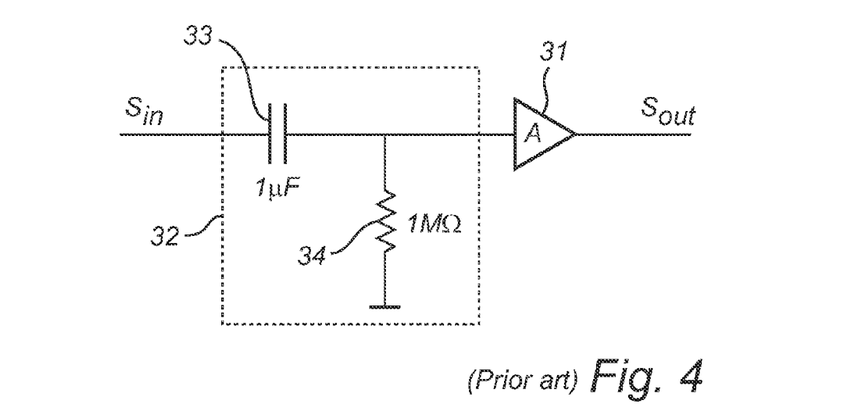
FIG. 4 indicates AC-coupled amplifier circuitry according to a prior art solution for removing the DC-component from the measurement signal.

In some prior art systems, the signal that is output from the sample-and-hold circuitry is therefore fed to an AC-coupled amplifier circuit, such as that which is indicated in FIG. 4.

As is schematically shown in FIG. 4, the AC-coupled amplifier circuit according to the prior art comprises an amplifier 31, and a high-pass filter 32 provided between the sample-and-hold circuit 29 and the amplifier 31. The high-pass filter is realized by the capacitor 33 and the resistor 34 in FIG. 4.

Under steady-state conditions, this solution would appear to be sufficient. However, the signal output from the sample-and-hold circuit 29 contains frequency components near DC, which should preferably not be removed from the measurement signal. Therefore, the high-pass filter 32 would be dimensioned to block DC, but to allow passage of near DC frequencies. This results in a high time constant, and a corresponding slow step response of the AC-coupled amplifier circuit, as is schematically indicated in FIG. 5.

Figure 5:
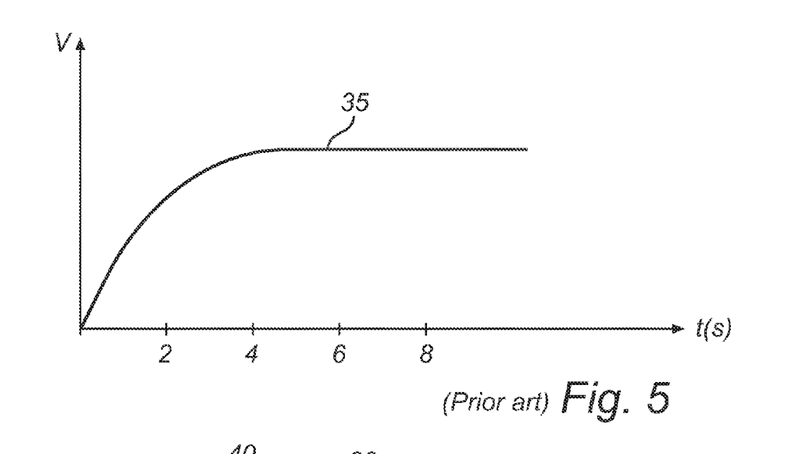
FIG. 5 is a diagram schematically illustrating the step response of the circuitry in FIG. 4.

In FIG. 5, the step response of the AC-coupled amplifier in FIG. 4 is shown for the capacitance and resistance indicated in that figure. As is evident from FIG. 5, the startup time (the time from power on until the system is operational) resulting from use of the AC-coupled amplifier in FIG. 4 is several seconds.

This startup time can be reduced considerably using various embodiments of the radar level gauge system according to the present invention. Instead of the prior art amplifier circuitry shown in FIG. 4, embodiments of the radar level gauge system according to the present invention include a first feedback circuit, a second feedback circuit, and activation circuitry allowing selective activation of the first feedback circuit and the second feedback circuit. The first feedback circuit comprises a feedback loop including a first integrator having a first time constant, and the second feedback circuit comprises a feedback loop including a second integrator having a second time constant being higher than the first time constant.

Figure 6A:
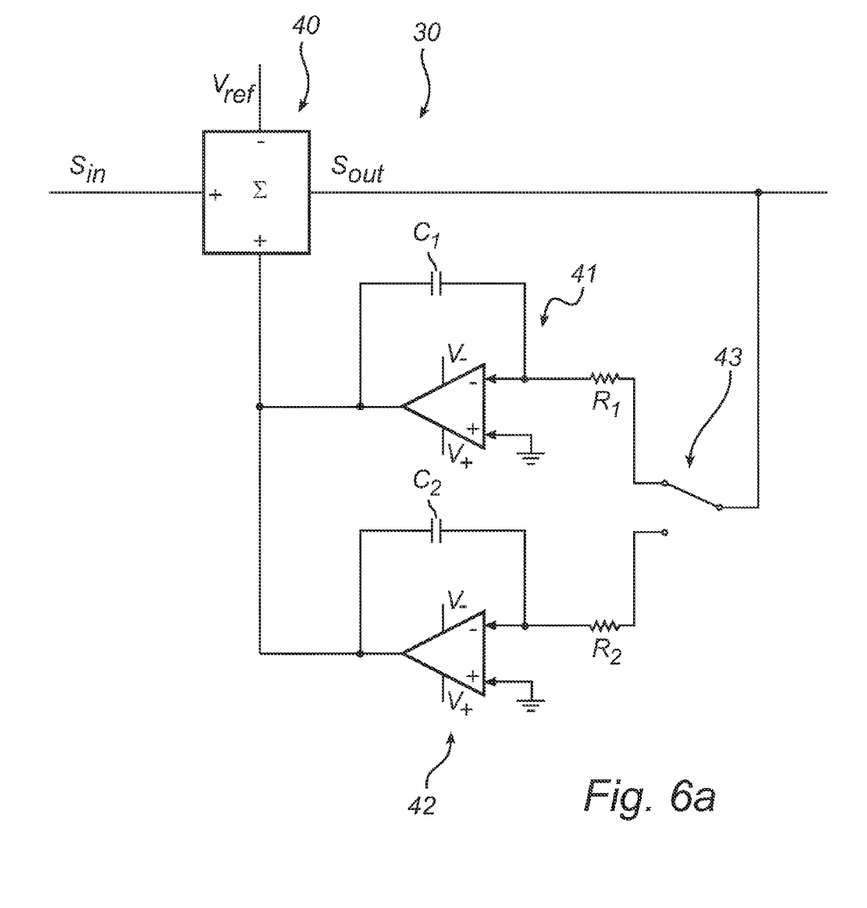
FIG. 6a schematically illustrates first exemplary amplifier circuitry comprised in a radar level gauge system according to an embodiment of the present invention.

FIG. 6a schematically illustrates first exemplary amplifier circuitry comprised in a radar level gauge system according to an embodiment of the present invention.

With reference to FIG. 6a, the amplifier circuitry 30 comprises an analog adder 40, a first integrator 41, a second integrator 42, and activation circuitry in the form of a switch 43.

When the switch 43 is in its first state, State 1, a first feedback circuit is formed by the differential amplifier 40 and the first integrator 41, and when the switch 43 is in its second state, State 2, a second feedback circuit is formed by the differential amplifier 40 and the second integrator 42.

In FIG. 6a, the first integrator has a first time constant $\tau_1 = R_1 C_1$, and the second integrator has a second time constant $\tau_2 = R_2 C_2$, which is greater than $\tau_1$.

According to one example, the following parameter values may be used:

$R_1 = 1$ k$\Omega$
$R_2 = 2$ M$\Omega$
$C_1 = C_2 = 100$ nF

It should be noted that the present invention is in no way limited by the exemplary circuit configuration that is schematically shown in FIG. 6a. The illustration provided there is intended to explain the invention, and the circuit configuration of FIG. 6a may readily be expanded or simplified by those skilled in the art without departing from the scope of the present invention.

Figure 6B:
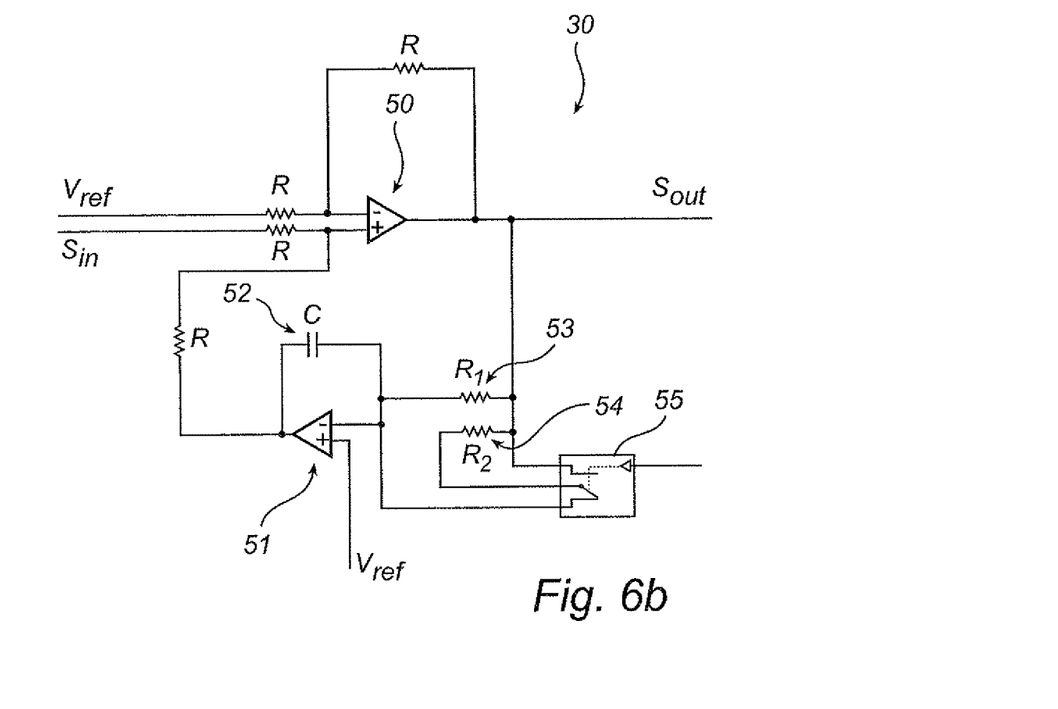
FIG. 6b schematically illustrates second exemplary amplifier circuitry comprised in a radar level gauge system according to an embodiment of the present invention.

For example, the selective activation of the first feedback circuit or the second feedback circuit may alternatively be achieved by switching between two resistor configurations as is schematically illustrated in FIG. 6b, which is a simplified circuit diagram for a second exemplary amplifier circuitry comprised in a radar level gauge system according to an embodiment of the present invention. The amplifier circuitry 30 as implemented in FIG. 6b comprises an analog adder implemented using an operational amplifier 50 and a number of resistors, denoted 'R'.

As can be seen in FIG. 6b, the feedback loop of the amplifier circuitry comprises an operational amplifier 51, a capacitor 52, a first resistor 53, a second resistor 54 and a switch 55.

The operational amplifier 51 and the capacitor 52 are common to the first integrator and the second integrator. In FIG. 6b, the switch is illustrated in a first state in which the resistance value for the integrator circuit corresponds to parallel coupling of the first resistor 53 and the second resistor 54. This first state will result in the first integrator with a first time constant given by the (low) resistance value and the capacitance of the common capacitor 52.

When the switch 55 is controlled to a second state, the second resistor 54 is short circuited, which means that the resistance value for the integrator circuit will be the resistance $R_1$ of the first resistor 53. This second state will result in the second integrator with a second time constant given by the (high) resistance value and the capacitance of the common capacitor 52.

Due to the shortcircuiting of the second resistor 54 in the second state, the switch 55 illustrated in FIG. 6b will, as will be evident to those skilled in the art, result in glitchless switching.

Figure 7:
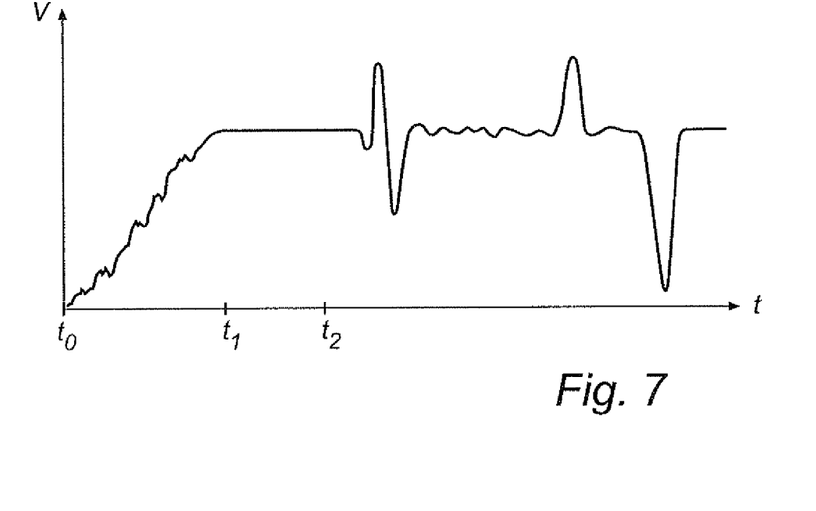
FIG. 7 schematically illustrates an exemplary measurement signal obtained using the radar level gauge system in FIG. 3 comprising the amplifier circuitry in FIG. 6a or FIG. 6b.

FIG. 7 schematically illustrates an exemplary measurement signal obtained using the radar level gauge system in FIG. 3 comprising the amplifier circuitry in FIG. 6a or FIG. 6b.

With reference to FIG. 7, FIG. 3 and FIGS. 6a-b, power is provided to the measurement circuitry 26 at the time $t_0$. When the voltage has reached a steady level, at time $t_1$ in FIG. 7, the switch 43, 55 is operated to activate the first feedback circuit comprising a feedback loop with the first integrator 41 having the first time constant $\tau_1$. Since the first time constant $\tau_1$ is relatively small, the first feedback circuit can almost instantly remove the DC offset from the measurement signal.

When the DC offset has been removed from the measurement signal, the switch 43, 55 is operated to activate the second integrator having the second time constant $\tau_2$. Due to the greater time constant of the second integrator, the second feedback circuit compensates for variations in the DC-offset, which may, for example be caused by a varying filling level and/or temperature drift in various circuitry, such as the sample-and-hold circuit 29, while allowing passage through the amplifying circuitry 30 of low frequency components of the measurement signal. In the diagram in FIG. 7, the operation of the switch 43, 55 to activate the second feedback circuit takes place before the reflected signal is expected to arrive at the measurement circuitry 26. In FIG. 7, the point in time at which the second feedback circuit is activated is indicated by $t_2$. An embodiment of the method of determining a filling level of a product contained in a tank using a radar level gauge system, according to the present invention will now be described with reference to the flow chart in FIG. 8.

Figure 8:
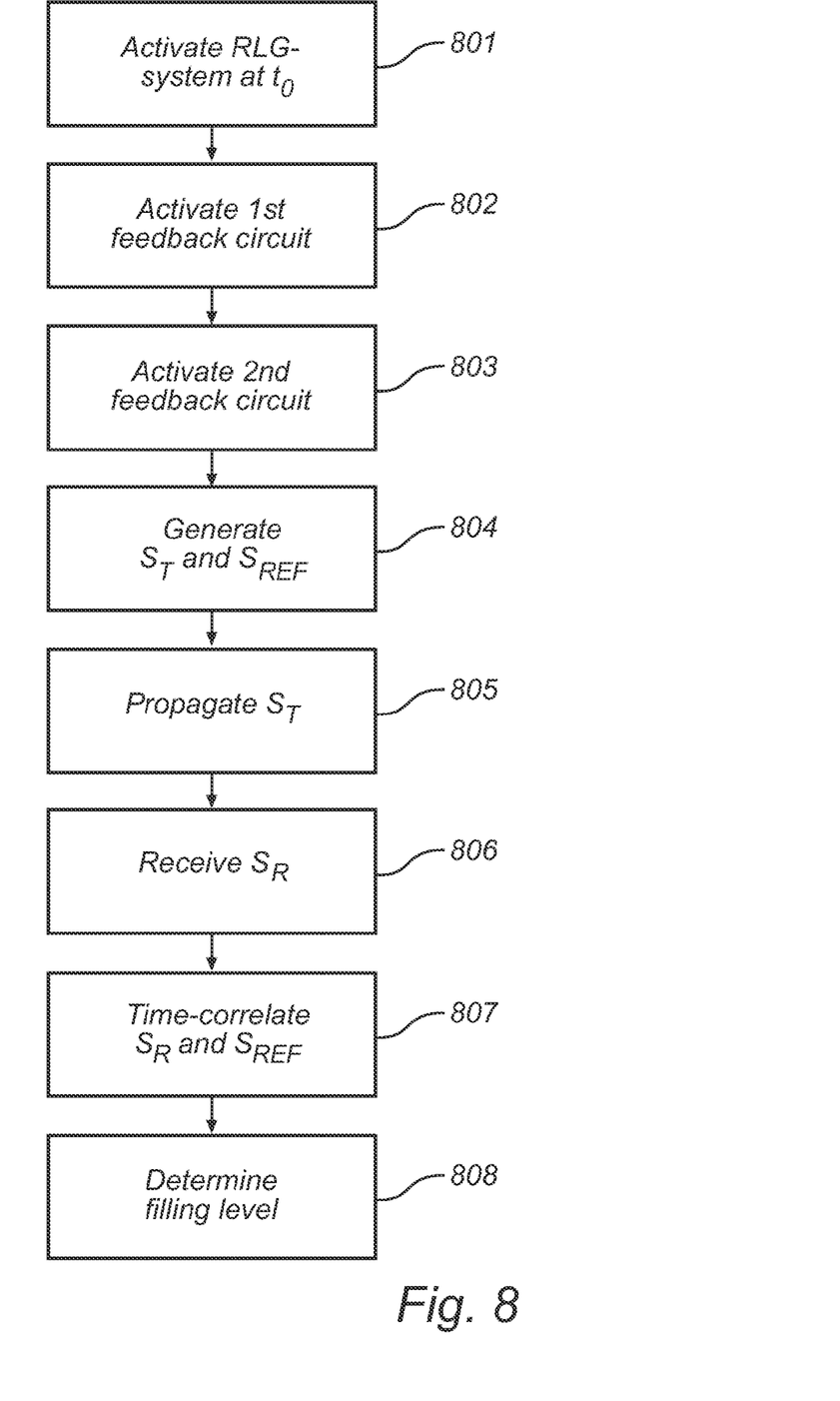
FIG. 8 is a flow chart schematically illustrating an embodiment of the method according to the present invention.

In step 801, the radar level gauge system is activated at an activation time $t_0$. The radar level gauge system may, for example, be activated by providing electrical power to the radar level gauge system to take the radar level gauge system from an inactive state where very little or no energy is consumed to an active state in which filling level determination can take place.

After the activation of the radar level gauge system, the first feedback circuit 41 is activated at $t_1$ in step 802. After the voltage level has reached a stable level, at a predetermined time $t_2$, the second feedback circuit 42 is activated, instead of the first feedback circuit 41, in step 803.

Also following the activation step 801, a transmission signal $S_T$ and a reference signal $S_{REF}$ are generated in step 804. The transmission signal $S_T$ is propagated (step 805) towards the surface 7 of the product 6 in the tank 5, and a reflected signal $S_R$ is received in step 806. The reference signal $S_{REF}$ and the received signal $S_R$ are time-correlated in step 807 to generate a sequence of values each representing a time correlation between a pulse of the reference signal $S_{REF}$ and the reflected signal $S_R$.

These steps should take place at such a time that the second feedback circuit 42 is activated when the measurement signal arrives at the measurement circuitry 26. For example, the transmission signal $S_T$ may be generated after $t_1$.

Finally, in step 808, the filling level is determined by the processing circuitry based on the result of the time correlation.

What is claimed is:

1. A radar level gauge system, for determination of a filling level of a product contained in a tank, said radar level gauge system comprising:
    first pulse generating circuitry for generating a transmission signal in the form of a first pulse train having a first pulse repetition frequency;
    second pulse generating circuitry for generating a reference signal in the form of a second pulse train having a second pulse repetition frequency, said second pulse repetition frequency differing from said first pulse repetition frequency by a predetermined frequency difference;
    a propagation device connected to said first pulse generating circuitry and arranged to propagate said transmission signal towards a surface of said product inside the tank, and to return a reflected signal resulting from reflection of said transmission signal at said surface of the product contained in the tank;

measurement circuitry connected to said propagation device and connectable to said second pulse generating circuitry, said measurement circuitry being configured to form a measurement signal based on said reflected signal and said reference signal; and processing circuitry connected to said measurement circuitry for determining a value indicative of a filling level based on said measurement signal, wherein said measurement circuitry comprises:

a time-correlator for generating a sequence of values, each value representing a time correlation between a pulse of the reference signal and the reflected signal;

a first feedback circuit arranged to receive a signal indicative of said sequence of values, said first feedback circuit comprising a feedback loop including a first integrator having a first time constant;

a second feedback circuit arranged to receive said signal indicative of said sequence of values, said second feedback circuit comprising a feedback loop including a second integrator having a second time constant being higher than said first time constant; and activation circuitry allowing selective activation of said first feedback circuit and said second feedback circuit.

2. The radar level gauge system according to claim 1, wherein said first feedback circuit and said second feedback circuit share a common differential amplifier.

3. The radar level gauge system according to claim 2, wherein:

said first integrator comprises a first capacitor and a first resistor; and said second integrator comprises said first capacitor and a second resistor different from said first resistor.

4. The radar level gauge system according to claim 1, wherein each of said first feedback circuit and said second feedback circuit, when activated, is DC-coupled to said time-correlator.

5. The radar level gauge system according to claim 1, wherein said measurement circuitry further comprises a sample-and-hold circuit having an input connected to said time-correlator and an output connectable to an input of each of said first feedback circuit and said second feedback circuit.

6. The radar level gauge system according to claim 1, wherein said propagation device is a probe.

7. The radar level gauge system according to claim 1, being powered by a local power source, such as a battery.

8. The radar level gauge system according to claim 1, further comprising a radio transceiver for wireless communication with an external device.

9. A method of determining a filling level of a product contained in a tank using a radar level gauge system, said method comprising the steps of:

activating said radar level gauge system at an activation time;

generating a transmission signal, said transmission signal being in the form of a first pulse train having a first pulse repetition frequency;

generating a reference signal in the form of a second pulse train having a second pulse repetition frequency, said second pulse repetition frequency differing from said first pulse repetition frequency by a predetermined frequency difference;

propagating said transmission signal towards a surface of said product contained in the tank;

receiving a reflected signal resulting from reflection of said transmission signal at said surface of said product;

forming a measurement signal based on said reflected signal and said reference signal; and determining a value indicative of said filling level based on said measurement signal, wherein said step of forming said measurement signal comprises the steps of:

time-correlating said reference signal and said reflected signal to generate a sequence of values, each value representing a time correlation between a pulse of the reference signal and the reflected signal;

during a time period following said activation time, passing a signal indicative of said sequence of values through a first feedback circuit comprising a feedback loop including a first integrator having a first time constant; and after said time period following said activation time, passing said signal indicative of said sequence of values through a second feedback circuit comprising a feedback loop including a second integrator having a second time constant being higher than said first time constant.

10. The method according to claim 9, wherein said step of forming said measurement signal further comprises the step of:

controlling an offset voltage of said measurement signal to allow indication of pulses that are negative in relation to said offset voltage as well as pulses that are positive in relation to said offset voltage.

11. The method according to claim 9, wherein said step of forming said measurement signal further comprises the step of:

sampling and holding said sequence of values to provide said signal indicative of said sequence of values.

* * * * *